(12) United States Patent
Horman (10) Patent No.: US 9,038,075 B2
(45) Date of Patent: May 19, 2015

(54) BATCH EXECUTION OF SYSTEM CALLS IN AN OPERATING SYSTEM

(71) Applicant: Red Hat, Inc., Raleigh, NC (US)

(72) Inventor: Neil R. T. Horman, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 293 days.

(21) Appl. No.: 13/684,633

(22) Filed: Nov. 26, 2012

(65) Prior Publication Data

US 2014/0149781 A1    May 29, 2014

(51) Int. Cl.
*G06F 9/46*    (2006.01)
*G06F 9/54*    (2006.01)
*G06F 11/14*    (2006.01)

(52) U.S. Cl.
CPC ............ *G06F 11/1415* (2013.01); *G06F 9/545* (2013.01)

(58) Field of Classification Search
None
See application file for complete search history.

(56) References Cited

U.S. PATENT DOCUMENTS 8,752,064 B2 *   6/2014   Sander et al. ................. 719/312
2010/0100774 A1 *   4/2010   Ding et al. ...................... 714/45
2013/0275997 A1 *   10/2013   Soares et al. ................. 719/312

* cited by examiner

*Primary Examiner* — Qing Wu
(74) *Attorney, Agent, or Firm* — Lowenstein Sandler LLP (57) ABSTRACT

A system and a method are disclosed for batch execution of system calls in an operating system. In one implementation, a processing device configures a system call batching buffer table in a user space of an operating system, the system call batching buffer table including a plurality of system call units, associates a system call number with the system call batching buffer table, and issues a trap instruction to a kernel of the operating system to execute at least one of the plurality of system call units, the trap instruction including the system call number.

18 Claims, 5 Drawing Sheets

BATCH EXECUTION OF SYSTEM CALLS IN AN OPERATING SYSTEM

TECHNICAL FIELD

The present disclosure relates to a computer system, and more specifically, to providing batch execution of system calls in an operating system.

BACKGROUND

An operating system (OS) generally provides two (2) categories of execution space. The first category is the user space for executing general applications, web browsers, programs word processors, and user programs. The second category is the kernel, which is a protected region of memory execution space inside of a computer. The kernel arbitrates access to the hardware and allows sharing of resources between user space programs.

A system call (syscall) is a common method for applications to request operating system controlled services and resources. Syscalls are an integral part of how an application takes advantage of an operating system, and have standardized interfaces. A syscall is how a program requests a service from the kernel. This may include hardware related services (e.g. accessing the hard disk), creating and executing new processes, and communicating with integral kernel services (e.g., scheduling). Syscalls provide an interface between a process and the operating system.

Many operating systems (e.g., the Linux® OS) implement a system call (syscall) by placing its associated syscall number and its related syscall arguments in pre-defined central processing unit (cpu) registers or memory locations, and then executing a cpu trap instruction. An example of a trap instruction is a subroutine call that interrupts the normal execution flow of the cpu, saves the current execution context, vectors to a trap handler location, reads the system call number and associated arguments, puts the processor in a privilege mode, and performs the corresponding requested service. Nominally, each syscall is triggered individually, such that each syscall requires its own trap instruction.

A trap instruction generally causes the cpu to slow down. Caches are flushed, instruction caches are invalidated, and instructions are halted in order to accommodate the trap instruction. Generally, a trap instruction is an impediment to the optimization of a program's execution. If a process requires a lot of system calls, and therefore a lot of traps, this can result in significant performance degradation of the program's execution.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Methods and systems for providing batch execution of system calls in an operating system are described. Rather than executing each system call individually, implementations of the present disclosure allow for multiple system calls to be executed using a single trap period, thus significantly accelerating application execution.

Figure 1:
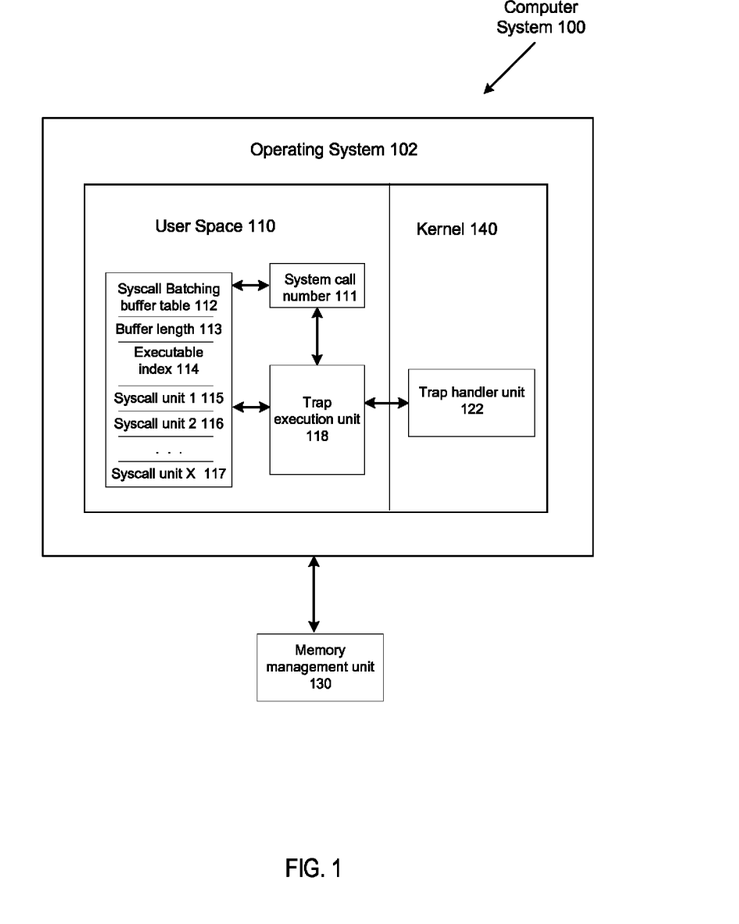
FIG. 1 depicts a block diagram illustrating an example system architecture for providing batch execution of system calls in accordance with the present disclosure.
Figure 2:
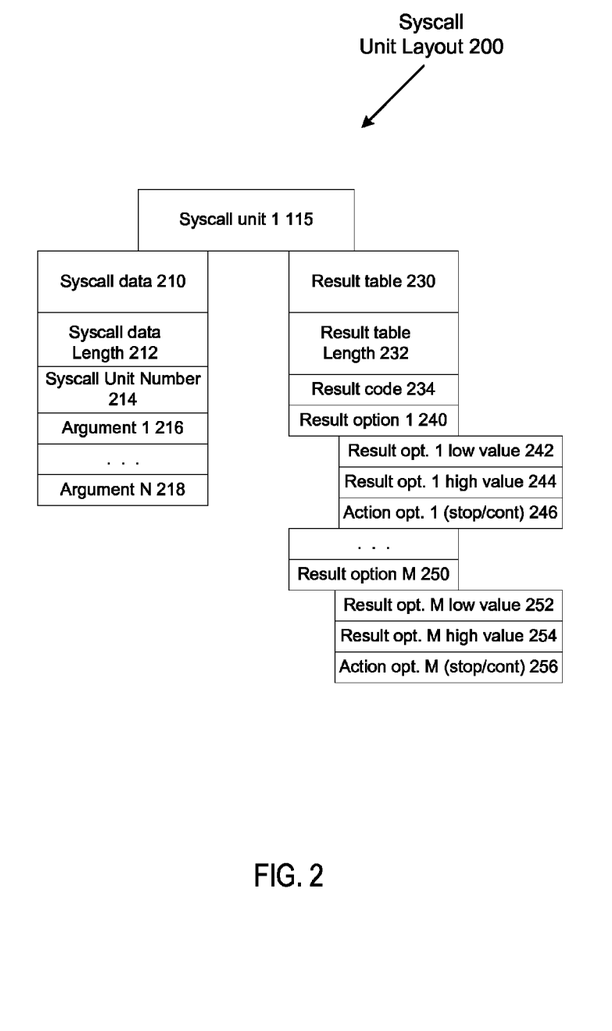
FIG. 2 depicts a block diagram illustrating an example of a syscall unit layout for providing batch execution of system calls in accordance with the present disclosure.

An additional system call number may be allocated which takes a single argument, a pointer to a memory location, in which a calling application lays out a series of data buffers containing information to execute several system calls. FIG. 1 shows a top level layout of this memory buffer. FIG. 2 shows a relationship where for each syscall unit in this buffer, the requsite syscall number and arguments are provided as well as a result table, which directs the kernel's behavior dependent on the result of the associated syscall. Additionally, meta data is provided at the head of the buffer so that the kernel may indicate to the calling application how many calls provided in the buffer were executed and what their results were. In this fashion, an application may accelerate its execution by trapping into the kernel once to execute multiple system calls, and fully understand what the results of those calls were after execution completes.

In the following description, numerous details are set forth. It will be apparent that the aspects of the present disclosure may be practiced without these specific details. In some instances, well-known structures and devices are shown in block diagram form, rather than in detail, in order to avoid obscuring the disclosure.

FIG. 1 depicts a block diagram of a computer system 100 that may be part of a computing system such as a client computer (e.g., a personal computer, a laptop, a PDA, a mobile phone, etc), a server computer, a gateway computer, etc. An example computer system is described in greater detail below in conjunction with FIG. 5.

Computer system 100 includes an operating system 102 (e.g., Linux® OS, Windows® OS, etc.). The operating system 102 segregates virtual memory of the computer system 100 into user space 110 and kernel space 140. The user space 110 is reserved for running general applications, web browsers, programs word processors, and user programs. The kernel space 140 is a protected region of memory execution space used by kernel 140 to arbitrate access to the hardware and allow sharing of resources between user space programs.

The user space 110 of FIG. 1 includes a system call (syscall) batching buffer table 112, which depicts an overview of a memory layout, in accordance with some implementations of this disclosure. The syscall batching buffer table 112 includes a buffer length 113, an executable index 114, and a plurality of syscall units (e.g., syscall unit 1 115, syscall unit 2 116, ..., syscall unit X 117). Each syscall unit corresponds to an individual system call issued by an application executing in the user space 110.

The buffer length 113 is a record that indicates a length of the syscall batching buffer table 112. When a trap instruction is issued, the buffer length 113 indicates to the kernel 140 the length of the syscall batching buffer table 112. The buffer length table 113 can also indicate the number of syscall units that are included in the syscall batching buffer table 112.

The executable index 114 is a reserved space to specify how many system call units were executed by the kernel 140. For example, if the syscall batching buffer table 112 includes 5 syscall units, then the buffer length 113 may indicate that the syscall batching buffer table 112 includes 5 syscall units. If, for example, after a trap instruction is executed, the kernel 140 attempts to execute syscall unit 1 but fails and the kernel 140 does not execute syscall units 2-5, the kernel 140 may indicate, via the executable index 114 that it attempted to execute syscall unit 1 but never attempted to execute syscall units 2-5.

The user space 110 of FIG. 1 also includes a trap execution unit 118. The trap execution unit 118 may be a module that creates and populates the contents of the syscall batching buffer table 112 and an associated system call number 111 and places them in a pre-defined memory location in preparation for the execution of the trap instruction. The system call number 111 represents an identifier of the syscall batching buffer table 112.

The kernel space 140 of FIG. 1 includes a trap handler unit 122. The trap handler unit 122 may be a module that allows the kernel 140 to receive a trap instruction, save the current execution context, read the contents of the syscall batching buffer table 112, execute the plurality of syscall units that are defined in the syscall batching buffer table 112, and inform the user space 110 of the kernel's 140 progress in executing this table of system call units via the executable index 114.

The computer system 100 includes memory management hardware, referred as a memory management unit (MMU) 130, to implement the mapping and translation of instructions to and from the trap execution unit 118 and the trap handler unit 122. The MMU 130 is a hardware device or circuit that translates a virtual address for the contents of the syscall batching buffer table 112 into a physical address for a memory location in the physical memory (e.g., RAM). In one example, computer system 100 includes a processor with an integral MMU 130. In another example, the MMU 130 is a separate chip.

FIG. 2 depicts a block diagram of an example of a syscall unit layout 200. Each syscall unit (e.g., syscall unit 1 115 of FIG. 1) comprises syscall data 210 and a result table 230. Syscall data 210 includes data and arguments relating to a specific syscall unit (e.g., Syscall Unit Number 214, as shown in FIG. 2), and the result table 230 includes indicators for the kernel 140 to indicate to the user space 110 (e.g., an application operating in the user space 110) whether a particular syscall unit was successfully executed or had failed, and the type of failure that may have occurred.

The syscall data 210 includes a syscall data length 212, a syscall unit number 214, and a plurality of arguments (e.g., argument 1 216, . . . , argument N 218).

The syscall data length 212 indicates a length of the syscall data 210. The syscall data length 212 may indicate the number of arguments that are included in the syscall data 210. The syscall data length 212 may also delineate where the syscall data 210 section ends and where the result table 230 begins.

The syscall unit number 214 is an identifier of a respective syscall unit (e.g., syscall unit 1 115), created by the trap execution unit 118. The syscall unit number 214 allows the kernel 140 to refer to a specific syscall unit from among the plurality of syscall units within the syscall batching buffer table 112.

Each of the plurality of arguments (e.g., argument 1 216, . . . , argument N 218) is a value or a piece of data supplied as part of a syscall when it is issued at run-time. The number of arguments in a syscall unit may vary depending on the type of syscall that is represented by the syscall unit. For example, a syscall that is related to a file management function of opening a file may have two arguments (e.g., the path of the file that is to be opened and the mode such as read only or read/write). A syscall that is related to opening a network socket may have several arguments (e.g., the host IP address to connect to; the port to connect to; data about blocking or non-blocking connections; the type of connection to use; the protocol to use; etc.).

The result table 230 includes a result table length 232, a result code 234, and a plurality of result options (e.g., result option 1 240, . . . , result option M 250). Each result option includes a result low value, a result high value, and an action (stop/continue).

The result table length 232 is metadata that indicates a length of the result table 230. The result table length 232 may also indicate the number of result options that are included in the result table 230.

The result code 234 may be an integer value in the range of −2 billion to +2 billion. The result code 234 is a descriptor for a result of the execution of a respective syscall (e.g., syscall unit 1 115). The result code 234 can indicate different parameters for different syscalls. For example, if a certain syscall relates to an acceptance of a connection to a socket, the result code 234 may be a nonnegative integer that is a descriptor for the accepted socket. If no socket is accepted, e.g., on error, a value of "−1" may be returned via the result code 234.

Each of the plurality of result options (e.g., result option 1 240 through result option M 250) includes a result low value (e.g., result opt. 1 low value 242), a result high value (e.g., result opt. 1 high value 244), and an action (stop/cont) indicator (e.g., action opt. 1 (stop/cont) 246).

The result low value and the result high value can specify a certain range of the result code 234 that causes or triggers a certain action. This allows for different actions (e.g., stop, continue, retry, return to the user space 110) to be defined for different result codes. For example, if a certain syscall relates to opening a file, several results may ensue which may warrant different actions. One result may be a failure to locate the file, and thus the file was not opened. In this case, the appropriate action may be to stop execution and return to the user space 110 if the file is required for subsequent actions in the syscall batching buffer table 112. If the file is not required for subsequent actions in the syscall batching buffer table 112, the appropriate action may be to continue to the next syscall unit. Another result may be that the file was located but is in use by another user, therefore the file is locked and cannot be opened at this time. In this case, the appropriate action may be to retry until the file becomes available to be opened. Another result may be that the file was located and opened successfully, in which the appropriate action may be either to return to the user space 110 or to continue to the next syscall unit.

Figure 3:
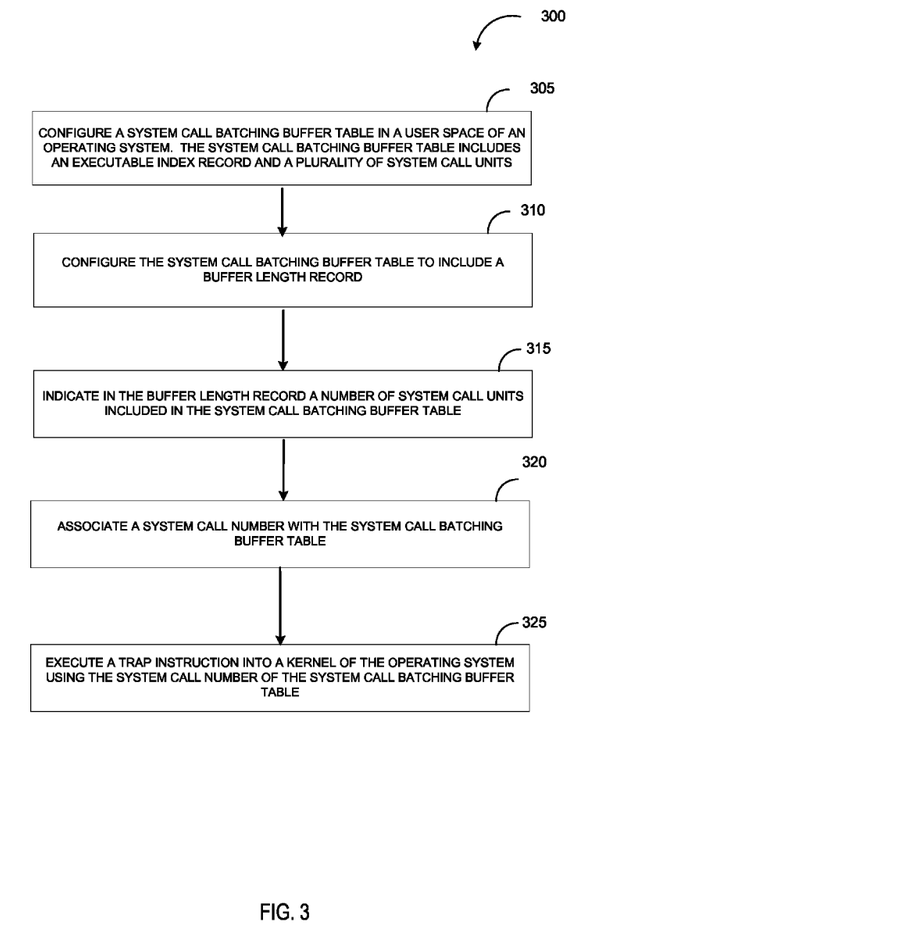
FIG. 3 depicts a flow diagram illustrating a method for providing batch execution of system calls in accordance with the present disclosure.

FIG. 3 depicts a flow diagram of aspects of an example method 300 for providing batch execution of system calls in an operating system 102. The method 300 may be performed by processing logic that may include hardware (e.g., circuitry, dedicated logic, programmable logic, microcode, etc.), software (e.g., instructions run on a processing device to perform hardware simulation), or a combination thereof. In one example, the method 300 may be performed by the trap execution unit 118 of FIG. 1.

For simplicity of explanation, methods are depicted and described as a series of acts. However, acts in accordance with this disclosure can occur in various orders and/or concurrently, and with other acts not presented and described herein.

Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 3, the method begins at block 305, when the trap execution unit 118 configures a system call batching buffer table 112 in a user space 110 of an operating system 102. The trap execution unit 118 may create an executable index record 114 and a plurality of system call units (e.g., syscall unit 1 115, syscall unit 2, 116, . . . syscall unit X 117) in the system call batching table 112. At block 310, the system call batching buffer table 112 is configured to further include a buffer length 113. At block 315, the buffer length 113 indicates the number of system call units (e.g., syscall unit 1 115, syscall unit 2, 116, . . . , syscall unit X 117) that are included in the system call batching buffer table 112. At block 320, the trap execution unit may create a system call number 111 and associates it with the system call batching buffer table 112.

Subsequently, upon entering a software interrupt condition such as a user program needing to access the kernel 140 to perform an operation or a group of operations, at block 325, the trap execution unit 118 issues a trap instruction for execution by the kernel 140 of the operating system 102 using the system call number 111.

Figure 4:
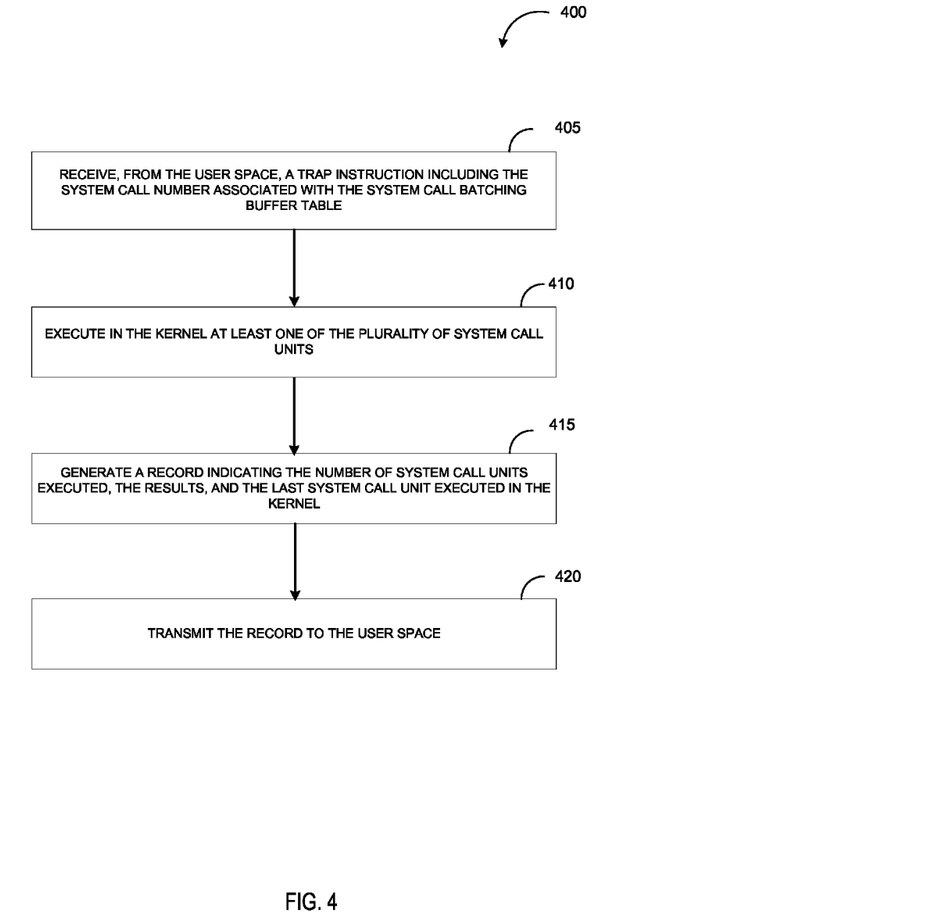
FIG. 4 depicts a flow diagram illustrating another example of a method for providing batch execution of system calls in accordance with the present disclosure.

FIG. 4 depicts a flow diagram illustrating a method 400 for executing a batch of a plurality of system calls in the kernel 140 of the operating system 102. The method 400 may be performed by processing logic that may include hardware (e.g., circuitry, dedicated logic, programmable logic, microcode, etc.), software (e.g., instructions run on a processing device to perform hardware simulation), or a combination thereof. In one example, the method 400 may be performed by the trap handler unit 122 of FIG. 1

Referring to FIG. 4, the method begins at block 405, when the trap handler unit 122 receives from the trap execution unit 118 the trap instruction including the system call number 111 associated with the system call batching buffer table 112. At block 410, the kernel 140 executes at least one of the plurality of system call units (e.g., syscall unit 1 115, syscall unit 2, 116, . . . syscall unit X 117) in the system call batching table 112. At block 415, the trap handler unit 122 generates a record indicating the number of system call units executed, the last system call unit executed, and the results of each executed system call unit. At block 420, the trap handler unit 122 transmits the record to the trap execution unit 118 in the user space 110.

Figure 5:
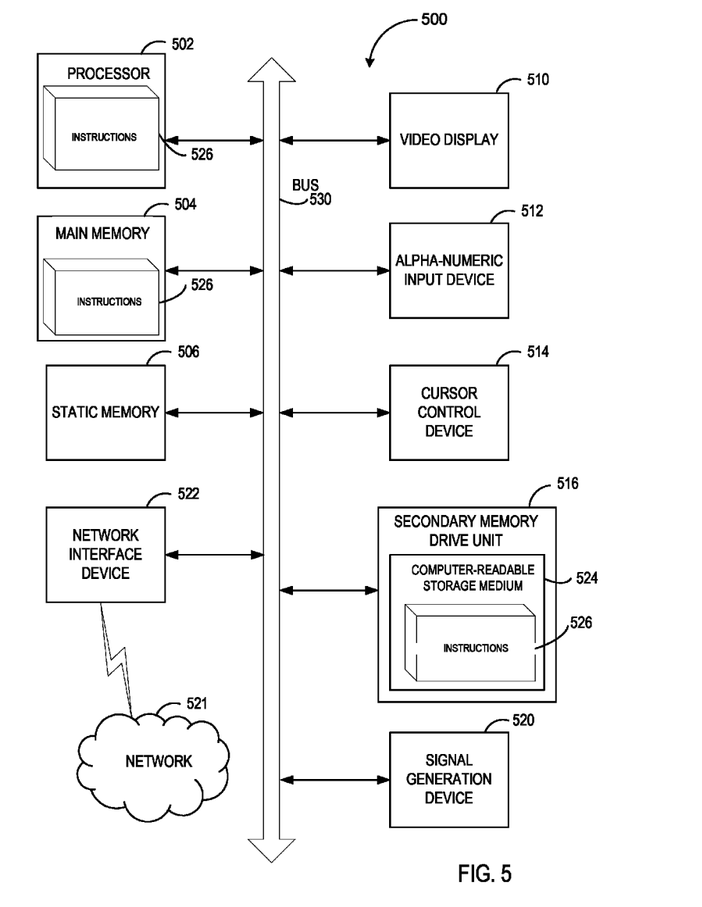
FIG. 5 depicts a diagrammatic representation of a machine in the form of a computer system, in accordance with one example.

FIG. 5 depicts a diagrammatic representation of a machine in the form of a computer system 500 within which a set of memory instructions 526, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 500 includes a processor 502 (e.g., a processing device), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions by the trap execution unit 118 or the trap handler unit 122 for performing the operations and steps discussed herein.

The computer system 500 may further include a network interface device 522. The network interface device may be in communication with a network 521. The computer system 500 also may include a video display unit 510 (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a computer-readable storage medium (or more specifically a non-transitory computer-readable storage medium) 524 on which is stored one or more sets of instructions 526 (e.g., instructions executed by the trap execution unit 118 or the trap handler unit 122) for the computer system 100 representing any one or more of the methodologies or functions described herein. The instructions 526 for the computer system 100 may also reside, completely or at least partially, within the main memory 504 and/or within the processor 502 during execution thereof by the computer system 500, the main memory 504 and the processing device 502 also constituting computer-readable storage media. The instructions 526 for the computer system 100 may further be transmitted or received over a network via the network interface device 522.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions 526. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "authenticating," "refraining," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    configuring, by a processing device, a system call batching buffer table in a user space of an operating system, the system call batching buffer table comprising a plurality of system call units;
    associating, by the processing device, a system call number with the system call batching buffer table; and
    issuing a trap instruction to a kernel of the operating system to execute at least one of the plurality of system call units, the trap instruction comprising the system call number.

2. The method of claim 1, further comprising:
    adding a last system call unit executed in the kernel to an executable index record in the system call batching buffer table.

3. The method of claim 1, wherein the system call batching buffer table further comprises a buffer length record, further comprising:
    indicating in the buffer length record a number of system call units included in the system call batching buffer table.

4. The method of claim 1, wherein each of the plurality of system call units comprises:
    a data table comprising a data table length record, a system call unit number, and a plurality of system call unit argument records; and
    a record table comprising a result table length record, a result code, and a plurality of result option records.

5. The method of claim 4, wherein each of the plurality of result option records comprises:
    a result low value record;
    a result high value record; and
    an action indicator record.

6. The method of claim 5 wherein the action indicator record instructs the kernel to continue executing another system call unit or not to continue or retry when one of the plurality of system call units fails to execute.

7. An apparatus comprising:
    a memory, a processing device coupled to the memory, and an operating system, the apparatus to:
    configure a system call batching buffer table in a user space of the operating system, comprising a plurality of system call units;
    associate a system call number with the system call batching buffer table;
    issue a trap instruction into a kernel of the operating system to execute at least one of the plurality of system call units, the trap instruction comprising the system call number.

8. The apparatus of claim 7, further comprising:
    add a last system call unit executed in the kernel to an executable index record in the system call batching buffer table.

9. The apparatus of claim 7, wherein the system call batching buffer table further comprises a buffer length record, further comprising:
    indicate in the buffer length record a number of system call units included in the system call batching buffer table.

10. The apparatus of claim 7, wherein each of the plurality of system call units comprises:
    a data table comprising a data table length record, a system call unit number, and a plurality of system call unit argument records; and a record table comprising a result table length record, a result code, and a plurality of result option records.

11. The apparatus of claim 10, wherein each of the plurality of result option records comprises:
 a result low value record;
 a result high value record; and
 an action indicator record.

12. The apparatus of claim 11 wherein the action indicator record instructs the kernel to continue executing another system call unit or not to continue or retry when one of the plurality of system call units fails to execute.

13. A non-transitory computer readable storage medium including instructions that, when executed by a processing device, cause the procesing device to:
 configure, by the processing device, a system call batching buffer table in a user space of an operating system, the system call batching buffer table comprising a plurality of system call units;
 associate, by the processing device, a system call number with the system call batching buffer table; and
 issue a trap instruction to a kernel of the operating system to execute at least one of the plurality of system call units, the trap instruction comprising the system call number.

14. The non-transitory computer readable storage medium of claim 13, the processing device further to:
 add a last system call unit executed in the kernel to an executable index record in the system call batching buffer table.

15. The non-transitory computer readable storage medium of claim 13, wherein the system call batching buffer table further comprises a buffer length record, the processing device further to:
 indicate in the buffer length record a number of system call units included in the system call batching buffer table.

16. The non-transitory computer readable storage medium of claim 13, wherein each of the plurality of system call units comprises:
 a data table comprising a data table length record, a system call unit number, and a plurality of system call unit argument records; and
 a record table comprising a result table length record, a result code, and a plurality of result option records.

17. The non-transitory computer readable storage medium of claim 16, wherein each of the plurality of result option records comprises:
 a result low value record;
 a result high value record; and
 an action indicator record.

18. The non-transitory computer readable storage medium of claim 17 wherein the action indicator record instructs the kernel to continue executing another system call unit or not to continue or retry when one of the plurality of system call units fails to execute.

* * * * *